(12) United States Patent
Kahlman et al.

(10) Patent No.: US 10,798,795 B2
(45) Date of Patent: *Oct. 6, 2020

(54) SEGMENTAL DRIVING OF LIGHT EMITTING CIRCUITS

(71) Applicant: SIGNIFY HOLDING B.V., Eindhoven (NL)

(72) Inventors: Henricus Marius Joseph Maria Kahlman, Dongen (NL); Ralph Kurt, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 42 days.

This patent is subject to a terminal disclaimer.

(21) Appl. No.: 16/101,296

(22) Filed: Aug. 10, 2018

(65) Prior Publication Data

US 2019/0053338 A1 Feb. 14, 2019

Related U.S. Application Data

(62) Division of application No. 15/519,387, filed as application No. PCT/EP2015/073347 on Oct. 9, 2015, now Pat. No. 10,076,006.

(30) Foreign Application Priority Data

Oct. 21, 2014 (EP) ...................................... 1489606

(51) Int. Cl.
*H05B 45/48* (2020.01)
*H05B 45/37* (2020.01)
(Continued)

(52) U.S. Cl.
CPC ............. *H05B 45/48* (2020.01); *H05B 45/37* (2020.01); *H05B 45/44* (2020.01); *H05B 45/50* (2020.01);
(Continued)

(58) Field of Classification Search
CPC ............. H05B 33/083; H05B 33/0887; H05B 33/0815; H05B 33/0824; H05B 33/0845;
(Continued)

(56) References Cited

U.S. PATENT DOCUMENTS 8,569,956 B2 10/2013 Shteynberg et al.
2012/0081009 A1 4/2012 Shteynberg et al.
(Continued)

FOREIGN PATENT DOCUMENTS

CN 103959904 A 7/2014
JP 2006244848 A 9/2006
(Continued)

*Primary Examiner* — Raymond R Chai
(74) *Attorney, Agent, or Firm* — Daniel J. Piotrowski

(57) ABSTRACT

Disclosed is a driver that include a switching circuit for guiding current signal during time-intervals for the sequential driving of light emitting circuit. The time-intervals are defined by the fact that amplitudes of a mains signal are in ranges during the time-intervals. More specifically, there is a bypass switching circuit for guiding a bypass current signal which bypasses all light emitting circuit during an initial time-interval. An adaptation circuit adapts amplitudes of the respective current signals during the respective time-intervals, to reduce a total harmonic distortion. Said adapting may comprise an adaptation in response to information derived from the amplitude of the mains signal, and may comprise shaping the amplitudes of the current signals in response to information derived from the amplitude of the mains signal.

9 Claims, 6 Drawing Sheets

(51) Int. Cl.
*H05B 45/44* (2020.01)
*H05B 45/50* (2020.01)
*H05B 45/10* (2020.01)
*H05B 47/10* (2020.01)
*G09G 3/34* (2006.01)
*H02M 3/156* (2006.01)
*H05B 41/282* (2006.01)
*H05B 41/392* (2006.01)

(52) U.S. Cl.
CPC ........... *G09G 3/3406* (2013.01); *H02M 3/156* (2013.01); *H05B 41/2827* (2013.01); *H05B 41/2828* (2013.01); *H05B 41/3927* (2013.01); *H05B 45/10* (2020.01); *H05B 47/10* (2020.01)

(58) Field of Classification Search
CPC ............ H05B 33/0818; H05B 41/3927; H05B 41/2828; H05B 41/2827; H05B 37/02; H05B 45/48; H05B 45/37; H05B 45/44; H05B 45/50; H05B 45/10; H02M 3/156; G09G 3/3406
See application file for complete search history.

(56) References Cited

U.S. PATENT DOCUMENTS

| | | | |
|---|---|---|---|
| 2012/0176826 A1* | 7/2012 | Lazar | H05B 47/10 363/126 |
| 2012/0262075 A1 | 10/2012 | Lynch et al. | |
| 2013/0293129 A1 | 11/2013 | Seider | |
| 2014/0049174 A1 | 2/2014 | Radermacher et al. | |
| 2014/0184077 A1 | 7/2014 | Lee et al. | |
| 2015/0319818 A1* | 11/2015 | Kahlman | H05B 47/10 315/201 |

FOREIGN PATENT DOCUMENTS

| | | |
|---|---|---|
| JP | 2013179288 A | 9/2013 |
| WO | 2013136301 A2 | 9/2013 |
| WO | 2014072847 A1 | 5/2014 |
| WO | 2014091356 A2 | 6/2014 |

* cited by examiner

SEGMENTAL DRIVING OF LIGHT EMITTING CIRCUITS

CROSS-REFERENCE TO PRIOR APPLICATIONS

This patent application is a Divisional Application of U.S. Ser. No. 15/519,387, filed Apr. 14, 2017, which claims the priority benefit under 35 U.S.C. 371 of International Patent Application No. PCT/EP2015/073347, filed Oct. 9, 2015, which claims the priority benefit of European Application No. 1489606, filed Oct. 21, 2014, the contents of which are herein incorporated by reference.

FIELD OF THE INVENTION

The invention relates to a driver for driving light emitting circuits. The invention further relates to a device comprising a driver, and to a method.

Examples of such light emitting circuits are light emitting diode circuits. Examples of such a device are lamps.

BACKGROUND OF THE INVENTION

U.S. 2012/0262075 A1 discloses a multiple stage sequential current regulator that provides low line current harmonics. Such low line current harmonics result in a relatively low total harmonic distortion, that however may still need to be further reduced.

U.S.20120176826A1 discloses a tapped linear driver wherein the switches S1 to SM are switched off according to input AC voltage. The load group LG1 is not controlled by any switch. A switch S1 is the first one to be switched off and allows current flowing through load group LG1 and LG2.

SUMMARY OF THE INVENTION

In the prior art, there is no current flowing, when the input voltage is less than a minimum voltage that turns on any light emitting circuit. Such a zero current does not match with the non-zero voltage of the mains thus results in harmonic distortion.

It is an object of the invention to provide an improved driver. It is a further object of the invention to provide a device and an improved method.

According to a first aspect, a driver is provided for driving light emitting circuits, the driver comprising
a bypass switching circuit for guiding a bypass current signal which bypasses all light emitting circuit during an initial time-interval, amplitudes of a mains signal for feeding the driver being in an initial range and less than a minimum voltage amplitude across a first light emitting circuit (91) to start emitting light during the initial time-interval,
a first switching circuit for guiding a first current signal through the first light emitting circuit during a first time-interval, amplitudes of the mains signal being in a first range during the first time-interval, the amplitudes of the mains signal in the first range being larger than the amplitudes of the mains signal in the initial range,
a second switching circuit for guiding a second current signal through a series connection of the first light emitting circuit and a second light emitting circuit during a second time-interval, amplitudes of the mains signal being in a second range during the second time-interval, the amplitudes of the mains signal in the second range being larger than the amplitudes of the mains signal in the first range, and
an adaptation circuit for adapting an amplitude of the bypass current signal during the initial time-interval and for adapting an amplitude of the first current signal during the first time-interval and for adapting an amplitude of the second current signal during the second time-interval so that at least one of the bypass current, the first current and the second current substantially follows the mains signal at least in the form.

The driver comprises a first switching circuit that guides a first current signal through a first light emitting circuit during a first time-interval. This first time-interval is the time-interval during which the amplitudes of a mains signal for feeding the driver are in a first range. The first switching circuit may comprise a switchable current source, as in U.S. 2012/0262075 A1, or may guide the first current signal to an individual current source (one individual current source per switching circuit) or to a general current source (one general current source for two or more switching circuits). The mains signal is for example a rectified version of a 50 Hz sine-wave voltage signal or a 60 Hz sine-wave voltage signal.

The driver comprises a second switching circuit that guides a second current signal through a combination of the first light emitting circuit and a second light emitting circuit during a second time-interval. This second time-interval is the time-interval during which the amplitudes of the mains signal are in a second range different from the first range. The second switching circuit may comprise a switchable current source, as in U.S. 2012/0262075 A1, or may guide the second current signal to an individual current source (one individual current source per switching circuit) or to a general current source (one general current source for two or more switching circuits). The amplitudes of the mains signal in the second range are larger than the amplitudes of the mains signal in the first range. The combination of the first light emitting circuit and a second light emitting circuit may for example be a serial combination.

To reduce a total harmonic distortion of the driver, the driver is provided with a bypass switching circuit and an adaptation circuit. The bypass switching circuit guides a bypass current signal during an initial time-interval. This initial time-interval is the time-interval during which the amplitudes of the mains signal are in an initial range. The bypass switching circuit may comprise a switchable current source or may guide the bypass current signal to an individual current source (one individual current source per switching circuit) or to a general current source (one general current source for two or more switching circuits). The amplitudes of the mains signal in the initial range are smaller than the amplitudes of the mains signal in the first range. The adaptation circuit adapts an amplitude of the bypass current signal during the initial time-interval and adapts an amplitude of the first current signal during the first time-interval and adapts an amplitude of the second current signal during the second time-interval.

So, compared to U.S. 2012/0262075 A1, during a larger part of a period of the mains signal, a current signal is drawn, and this current signal is not constant per time-interval, but is adapted during this time-interval. As a result, a total harmonic distortion of the driver can be further reduced. This is a great improvement.

An embodiment of the driver is defined by the bypass current signal not going through the first light emitting circuit and not going through the second light emitting circuit. During the initial time-interval, the light emitting circuits are not emitting light, and the bypass current signal is drawn to for example reduce a total harmonic distortion.

During the first time-interval, the first light emitting circuit is emitting light and the second light emitting circuit is not emitting light. During the second time-interval, the first and second light emitting circuits are both emitting light. Third light emitting circuits etc. and third time-intervals etc. are not to be excluded.

An embodiment of the driver is defined by said adapting comprising an adaptation in response to information derived from the amplitude of the mains signal. Preferably, the amplitude of the bypass current signal during the initial time-interval and the amplitude of the first current signal during the first time-interval and the amplitude of the second current signal during the second time-interval are adapted in response to information derived from the (instantaneous) amplitude of the mains signal. For example, in case the amplitude of the mains signal is changing to a relatively small (large) extent, the amplitude of the corresponding current signal may be adapted to a relatively small (large) extent.

An embodiment of the driver is defined by said adapting comprising an adaptation, said adaption comprising an increase of the amplitudes of the respective current signals when the amplitude of the mains signal in the respective ranges is increasing, and said adaption comprising a decrease of the amplitudes of the respective current signals when the amplitude of the mains signal in the respective ranges is decreasing. Preferably, when the amplitude of the mains signal in the respective ranges is increasing (decreasing), the amplitudes of the respective current signals may be increased (decreased) as well.

An embodiment of the driver is defined by said adapting comprising shaping the amplitudes of the current signals in response to information derived from the amplitude of the mains signal. Preferably, the amplitude of the bypass current signal during the initial time-interval and the amplitude of the first current signal during the first time-interval and the amplitude of the second current signal during the second time-interval are shaped in response to information derived from the (instantaneous) amplitude of the mains signal. For example, in case the amplitude of the mains signal has a first (second) shape, the amplitude of the corresponding current signal may be given a first (second) shape as well.

An embodiment of the driver is defined by said adapting comprising shaping the amplitudes of the respective current signals, the shaped amplitudes of the respective current signals being substantially identical to shapes of the amplitude of the mains signal in the respective ranges. Preferably, to get a lowest total harmonic distortion, the shapes of the amplitudes of the respective current signals will be substantially identical to the shapes of the amplitude of the mains signal in the respective ranges. Substantially identical here means that, after having scaled the starting points and ending points of the shapes such that both starting points or both ending points coincide, the surfaces below the shapes should differ <20%, preferably <10%, most preferably <5%.

An embodiment of the driver is defined by the bypass switching circuit comprising a bypass current switch and comprising a border control circuit for controlling the bypass current switch, the first switching circuit comprising a first current switch and comprising a first control circuit for controlling the first current switch, and the second switching circuit comprising a second current switch and comprising a second control circuit for controlling the second current switch. The bypass current switch guides the bypass current signal. The first current switch guides the first current signal. The second current switch guides the second current signal. The border control circuit defines the initial range. The first control circuit defines the first range. The second control circuit defines the second range. The term border intends to describe it is an interconnection period between the light emitting circuits emit light.

An embodiment of the driver is defined by the border control circuit comprising a border control switch and a border voltage divider comprising three resistors and first and second intermediate contacts, a control electrode of the bypass current switch being coupled to the first intermediate contact, and a control electrode of the border control switch being coupled to the second intermediate contact, the first control circuit comprising a first control switch and a first voltage divider comprising three resistors and first and second intermediate contacts, a control electrode of the first current switch being coupled to the first intermediate contact, and a control electrode of the first control switch being coupled to the second intermediate contact, and the second control circuit comprising a second control switch and a second voltage divider comprising three resistors and first and second intermediate contacts, a control electrode of the second current switch being coupled to the first intermediate contact, and a control electrode of the second control switch being coupled to the second intermediate contact. This is a simple, low cost and robust embodiment owing to the fact that each switching circuit consists of two switches such as for example transistors and one three-resistor-voltage-divider.

An embodiment of the driver is defined by values of one or more of the three resistors of the border voltage divider defining the initial range, values of one or more of the three resistors of the first voltage divider defining the first range, and values of one or more of the three resistors of the second voltage divider defining the second range. This is a simple, low cost and robust embodiment owing to the fact that in each switching circuit a three-resistor-voltage-divider defines the ranges.

An embodiment of the driver is defined by the adaptation circuit comprising a current source for in response to a definition signal defining the amplitudes of the bypass current signal, the first current signal and the second current signal, and the adaptation circuit further comprising a definition circuit for in response to a detection of the amplitude of the mains signal providing the definition signal to the current source. This is a simple, low cost and robust embodiment owing to the fact that one general current source is used for all switching circuits to define an amplitude of each current signal.

An embodiment of the driver is defined by the current source comprising a resistor, and the definition signal comprising a voltage signal. This is a simple, low cost and robust embodiment owing to the fact that a resistor is simple, low cost and robust.

An embodiment of the driver is defined by the current source further comprising one or more voltage definition components coupled serially to the resistor. This is a simple, low cost and robust embodiment owing to the fact that a voltage definition component such as a diode or a zener diode etc. is simple, low cost and robust.

More complex embodiments of the current source are not to be excluded. So, many other embodiments of the current source will be possible too.

An embodiment of the driver is defined by the definition circuit comprising an input voltage divider comprising two resistors and an intermediate contact, an inverting transistor, an interfacing voltage divider comprising three resistors and first and second intermediate contacts, a programmable regulator with a negative transfer, an output resistive network comprising two resistors, and an output transistor, a control electrode of the inverting transistor being coupled to the intermediate contact of the input voltage divider for said detection, a main electrode of the inverting transistor being coupled to the first intermediate contact of the interfacing voltage divider, a control input of the programmable regulator being coupled to the second intermediate contact of the interfacing voltage divider, an output of the programmable regulator being coupled to a main electrode of the output transistor, the control input and the output of the programmable regulator being coupled to one of the two resistors of the output resistive network, and a control electrode of the output transistor being coupled to the current source. A combination of an inverting transistor and a programmable regulator with a negative transfer has, of course, a positive transfer. So, many other embodiments of the definition circuit will be possible too, such as a combination of a non-inverting transistor and a programmable regulator with a positive transfer etc.

According to a second aspect, a device is provided comprising the driver as defined above and further comprising the light emitting circuits. A light emitting circuit may for example comprise a light emitting diode circuit that for example comprises one or more light emitting diodes of whatever kind and in whatever combination.

According to a third aspect, a method is provided for controlling a driver for driving light emitting circuits, the driver comprising a bypass switching circuit for guiding a bypass current signal during an initial time-interval, amplitudes of a mains signal for feeding the driver being in an initial range during the initial time-interval, a first switching circuit for guiding a first current signal through a first light emitting circuit during a first time-interval, amplitudes of the mains signal being in a first range during the first time-interval, the amplitudes of the mains signal in the first range being larger than the amplitudes of the mains signal in the initial range, a second switching circuit for guiding a second current signal through a serial combination of the first light emitting circuit and a second light emitting circuit during a second time-interval, amplitudes of the mains signal being in a second range during the second time-interval, the amplitudes of the mains signal in the second range being larger than the amplitudes of the mains signal in the first range, the method comprising a step of adapting an amplitude of the bypass current signal during the initial time-interval and adapting an amplitude of the first current signal during the first time-interval and adapting an amplitude of the second current signal during the second time-interval.

An insight is that the segmental driving of light emitting circuits may be responsible for total harmonic distortion. A basic idea is that, in addition to a first current signal flowing through a first light emitting circuit and a second current signal flowing through a combination of first and second light emitting circuits, a bypass current is to be introduced, and that each one of said currents is to be adapted while flowing, to allow a total harmonic distortion to be reduced.

A problem to provide an improved driver has been solved. A further advantage is that governmental regulations can be fulfilled more easily.

These and other aspects of the invention will be apparent from and elucidated with reference to the embodiments described hereinafter.

DETAILED DESCRIPTION OF EMBODIMENTS

Figure 1:
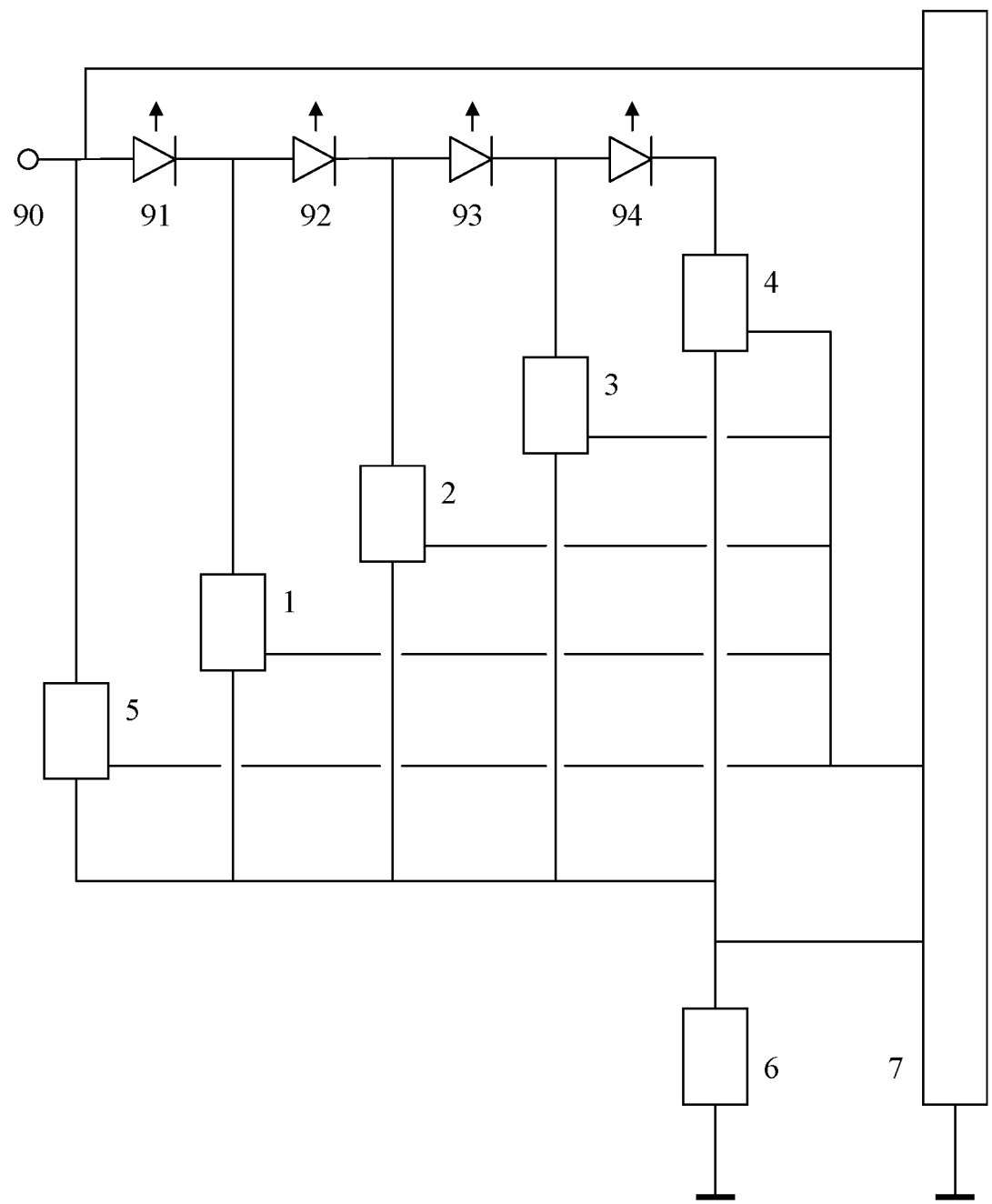
FIG. 1 shows an embodiment of a driver.

In the FIG. 1, an embodiment of a driver 1-7 is shown. This driver 1-7 can drive four light emitting circuits 91-94 such as for example four light emitting diode circuits. These four light emitting circuits 91-94 are coupled serially to each other. The light emitting circuit 91 is further coupled to a mains terminal 90 for receiving a mains signal such as for example a rectified 50 Hz sine-wave voltage signal or a rectified 60 Hz sine-wave voltage signal. The mains terminal 90 is further coupled to a first terminal of an adaptation circuit 6, 7 and to a bypass switching circuit 5, that is further coupled to second and third terminals of the adaptation circuit 6, 7. An interconnection between the first and second light emitting circuits 91, 92 is further coupled to a first switching circuit 1, that is further coupled to the second and third terminals of the adaptation circuit 6, 7. An interconnection between the second and third light emitting circuits 92, 93 is further coupled to a second switching circuit 2, that is further coupled to the second and third terminals of the adaptation circuit 6, 7. An interconnection between the third and fourth light emitting circuits 93, 94 is further coupled to a third switching circuit 3, that is further coupled to the second and third terminals of the adaptation circuit 6, 7. The fourth light emitting circuit 94 is further coupled to a fourth switching circuit 4, that is further coupled to the second and third terminals of the adaptation circuit 6, 7.

Figure 2:
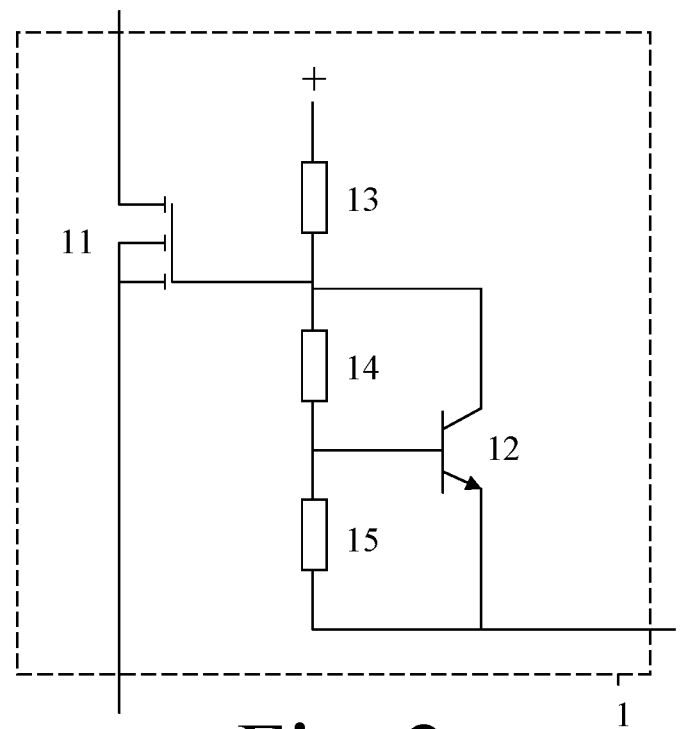
FIG. 2 shows an embodiment of a first switching circuit.

In the FIG. 2, an embodiment of a first switching circuit 1 is shown. The first switching circuit 1 comprises for example a first current switch 11 such as for example a first switching transistor such as for example a MOSFET and comprises for example a first control circuit 12-15 for controlling the first current switch 11. The first control circuit 12-15 comprises for example a first control switch 12 such as for example a first controlling transistor such as for example a bipolar transistor and comprises for example a first voltage divider 13-15 comprising three resistors and first and second intermediate contacts. A control electrode of the first current switch 11 is coupled to the first intermediate contact between the resistors 13 and 14, and a control electrode of the first control switch 12 is coupled to the second intermediate contact between the resistors 14 and 15. The resistor 13 is further coupled to a voltage supply and the resistor 15 is further coupled to a first main electrode of the first control switch 12. A second main electrode of the first control switch 12 may be coupled to the first intermediate contact.

Figure 3:
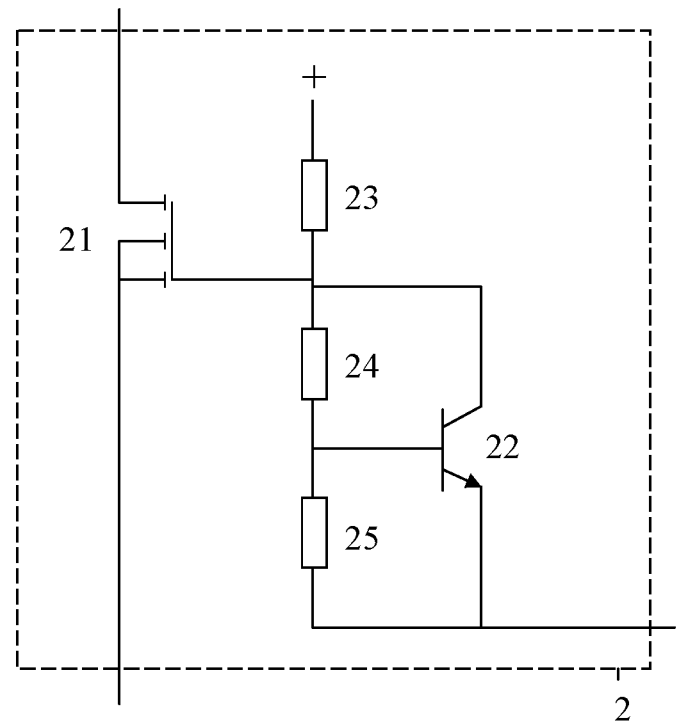
FIG. 3 shows an embodiment of a second switching circuit.

In the FIG. 3, an embodiment of a second switching circuit 2 is shown. The second switching circuit 2 comprises for example a second current switch 21 such as for example a second switching transistor such as for example a MOSFET and comprises for example a second control circuit 22-25 for controlling the second current switch 21. The second control circuit 22-25 comprises for example a second control switch 22 such as for example a second controlling transistor such as for example a bipolar transistor and comprises for example a second voltage divider 23-25 comprising three resistors and first and second intermediate contacts. A control electrode of the second current switch 21 is coupled to the first intermediate contact between the resistors 23 and 24, and a control electrode of the second control switch 22 is coupled to the second intermediate contact between the resistors 24 and 25. The resistor 23 is further coupled to a voltage supply and the resistor 25 is further coupled to a first main electrode of the second control switch 22. A second main electrode of the second control switch 22 may be coupled to the first intermediate contact.

Figure 4:
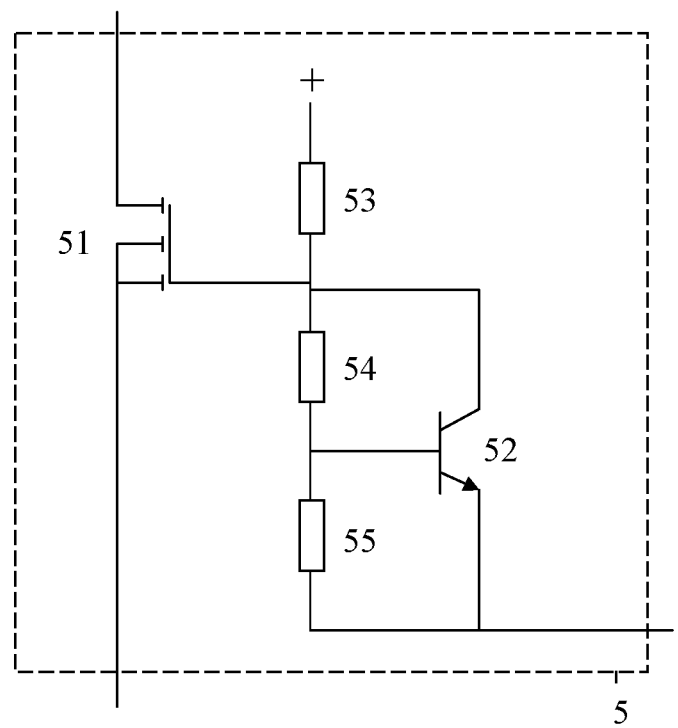
FIG. 4 shows an embodiment of a bypass switching circuit.

In the FIG. 4, an embodiment of a bypass switching circuit 5 is shown. The bypass switching circuit 5 comprises for example a bypass current switch 51 such as for example a border switching transistor such as for example a MOSFET and comprises for example a border control circuit 52-55 for controlling the bypass current switch 51. The border control circuit 52-55 comprises for example a border control switch 52 such as for example a border controlling transistor such as for example a bipolar transistor and comprises for example a border voltage divider 53-55 comprising three resistors and first and second intermediate contacts. A control electrode of the bypass current switch 51 is coupled to the first intermediate contact between the resistors 53 and 54, and a control electrode of the border control switch 52 is coupled to the second intermediate contact between the resistors 54 and 55. The resistor 53 is further coupled to a voltage supply and the resistor 55 is further coupled to a first main electrode of the border control switch 52. A second main electrode of the border control switch 52 may be coupled to the first intermediate contact.

The third and fourth switching circuits 3 and 4 may be realized identically to the switching circuits 1, 2 and 5 shown in the FIG. 2-4, apart from one or more values of their voltage dividers.

The adaptation circuit 6, 7 may for example comprise a current source 6 for, in response to a definition signal, defining (instantaneous) amplitudes of a bypass current signal flowing through the bypass switching circuit 5, of a first current signal flowing through the first switching circuit 1, of a second current signal flowing through the second switching circuit 2, of a third current signal flowing through the third switching circuit 3, and of a fourth current signal flowing through the fourth switching circuit 4. The adaptation circuit 6, 7 may further comprise a definition circuit 7 for providing the definition signal to the current source 6 in response to a detection of the (instantaneous) amplitude of the mains signal.

Figure 5:
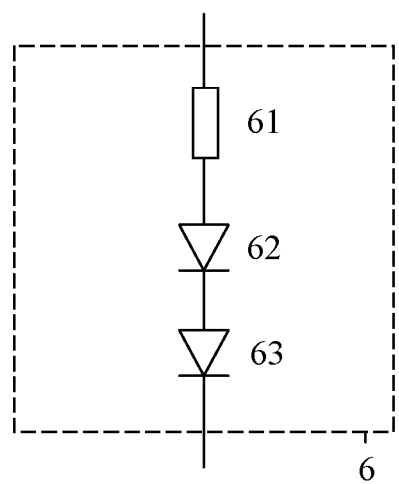
FIG. 5 shows an embodiment of a current source.

In the FIG. 5, an embodiment of a current source 6 is shown. The current source 6 comprises a serial coupling of a resistor 61 and two voltage definition components 62, 63 such as for example diodes or zener diodes etc. The definition signal may in this case comprise a voltage signal. The current source 6 is coupled to a first main electrode of the bypass current switch 51, with a second main electrode of the bypass current switch 51 being coupled to the mains terminal 90. The current source 6 is coupled to a first main electrode of the first current switch 11, with a second main electrode of the first current switch 11 being coupled to the interconnection between the first and second light emitting circuits 91, 92. The current source 6 is coupled to a first main electrode of the second current switch 21, with a second main electrode of the second current switch 21 being coupled to the interconnection between the second and third light emitting circuits 92, 93. Similarly, the current source 6 is coupled to first main electrodes of third and fourth current switches not shown in the drawings etc. The current source 6 is further coupled to ground.

Figure 6:
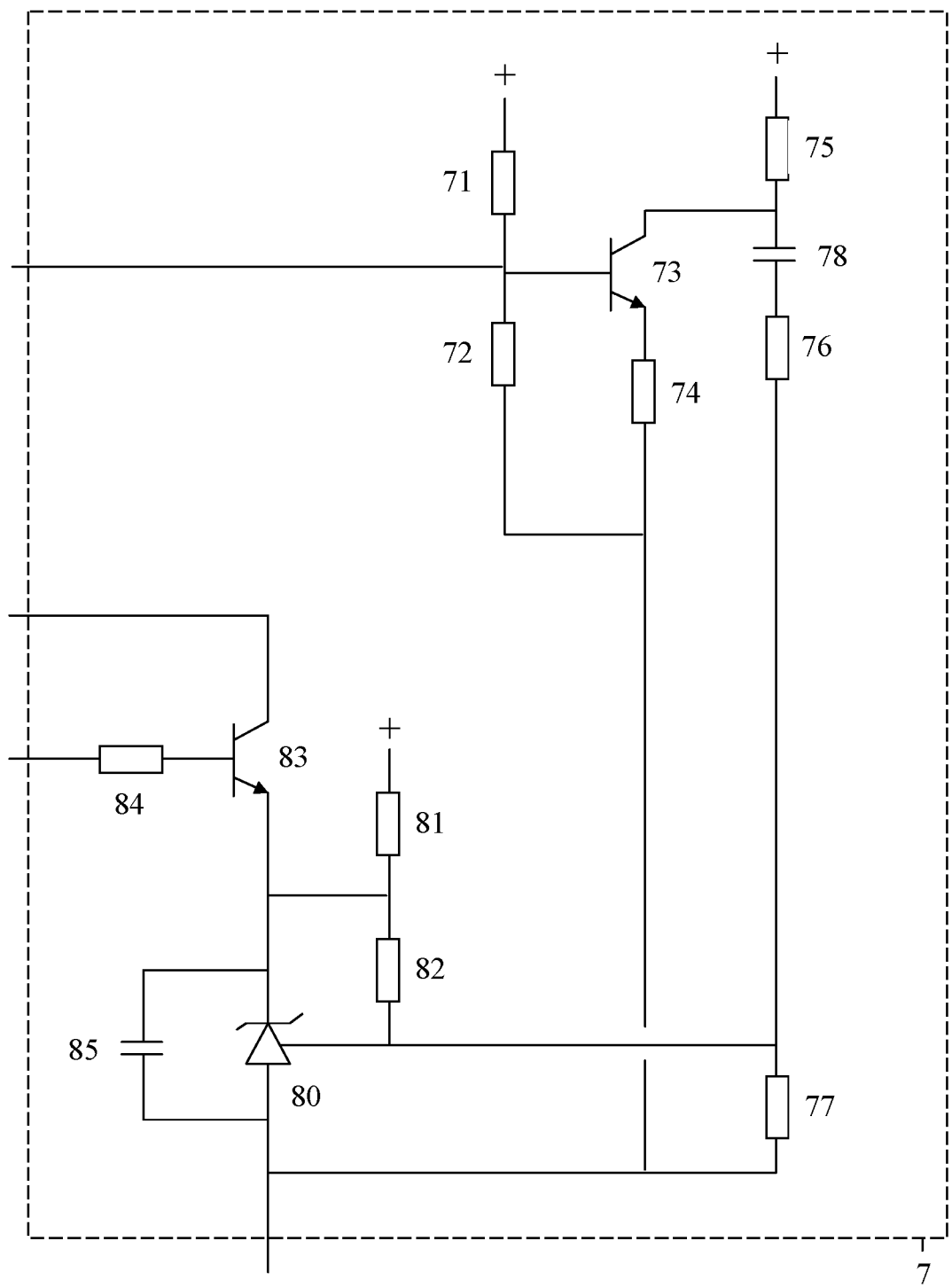
FIG. 6 shows an embodiment of a definition circuit.

In the FIG. 6, an embodiment of a definition circuit 7 is shown. The definition circuit 7 may for example comprise an input voltage divider 71, 72 comprising two resistors and an intermediate contact that forms the first terminal of the adaptation circuit 6, 7, which first terminal is coupled to the mains terminal 90. The definition circuit 7 may for example further comprise an inverting transistor 73. A control electrode of the inverting transistor 73 is coupled to the intermediate contact of the input voltage divider 71, 72 for said detection of the (instantaneous) amplitude of the mains signal. The resistor 71 is further coupled to a voltage supply and the resistor 72 is further coupled to ground. A first main electrode of the inverting transistor 73 is coupled via a resistor 74 to ground. A second main electrode of the inverting transistor 73 is coupled to a first intermediate contact of an interfacing voltage divider 75-77 comprising three resistors and, in addition to the first intermediate contact, a second intermediate contact. The resistor 75 is further coupled to a voltage supply and the resistor 77 is further coupled to ground. Between the resistors 75 and 76, a capacitor 78 may be present that can be considered to be a short-circuit for a mains frequency. The first intermediate contact is situated between this capacitor 78 and the resistor 75, and the second intermediate contact between the resistors 76 and 77 is coupled to a control input of a programmable regulator 80 with a negative transfer. An output of the programmable regulator 80 is coupled to a first main electrode of an output transistor 83. The control input and the output of the programmable regulator 80 are coupled to different sides of a resistor 82 of an output resistive network 81, 82. The programmable regulator 80 is further coupled to ground. The resistor 81 is further coupled to a voltage supply. A control electrode of the output transistor 83 is coupled via a resistor 84 to the current source 6. A second main electrode of the output transistor 83 is coupled to the first main electrodes of the first, second and border control switches 12, 22 and 52 (and to first main electrodes of third and fourth control switches not shown in the drawings). In parallel to the programmable regulator 80, a capacitor 85 may be present for filtering purposes. The second main electrode of the output transistor 83 forms the second terminal of the adaptation circuit 6, 7. One side of the resistor 84 is coupled to the control electrode of the output transistor 83 and the other side forms the third terminal of the adaptation circuit 6, 7.

Figure 7:
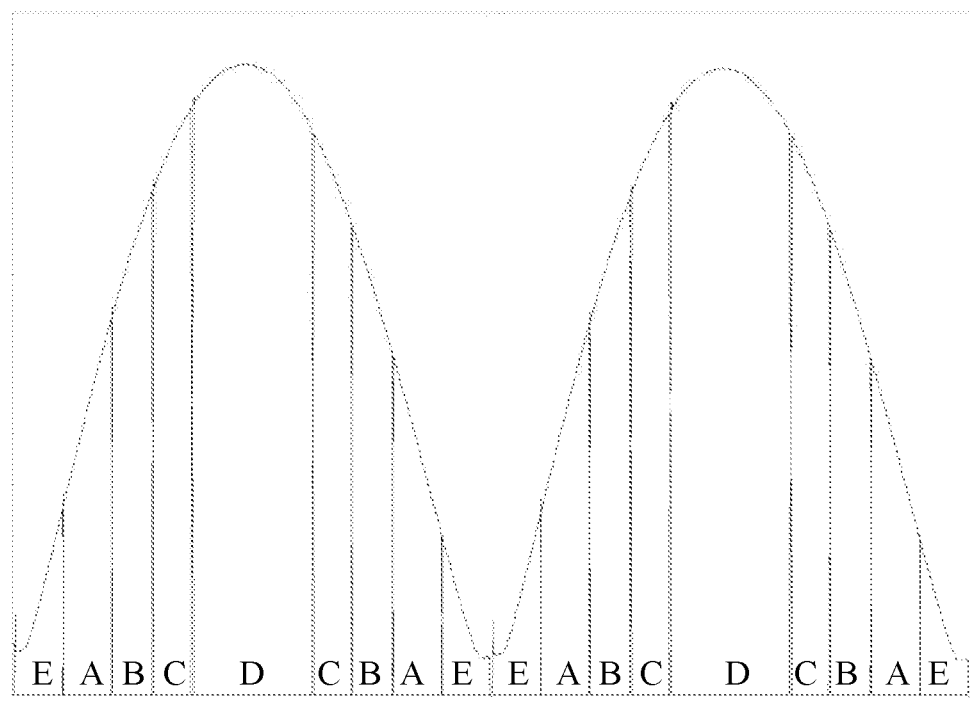
FIG. 7 shows amplitudes of current signals.

In the FIG. 7, amplitudes of current signals are shown, such as the bypass current signal flowing through the bypass switching circuit 5 during an initial time-interval E, the first current signal flowing through the first switching circuit 1 during a first time-interval A, the second current signal flowing through the second switching circuit 2 during a second time-interval B, the third current signal flowing through the third switching circuit 3 during a third time-interval C, and the fourth current signal flowing through the fourth switching circuit 4 during a fourth time-interval D etc.

Figure 8:
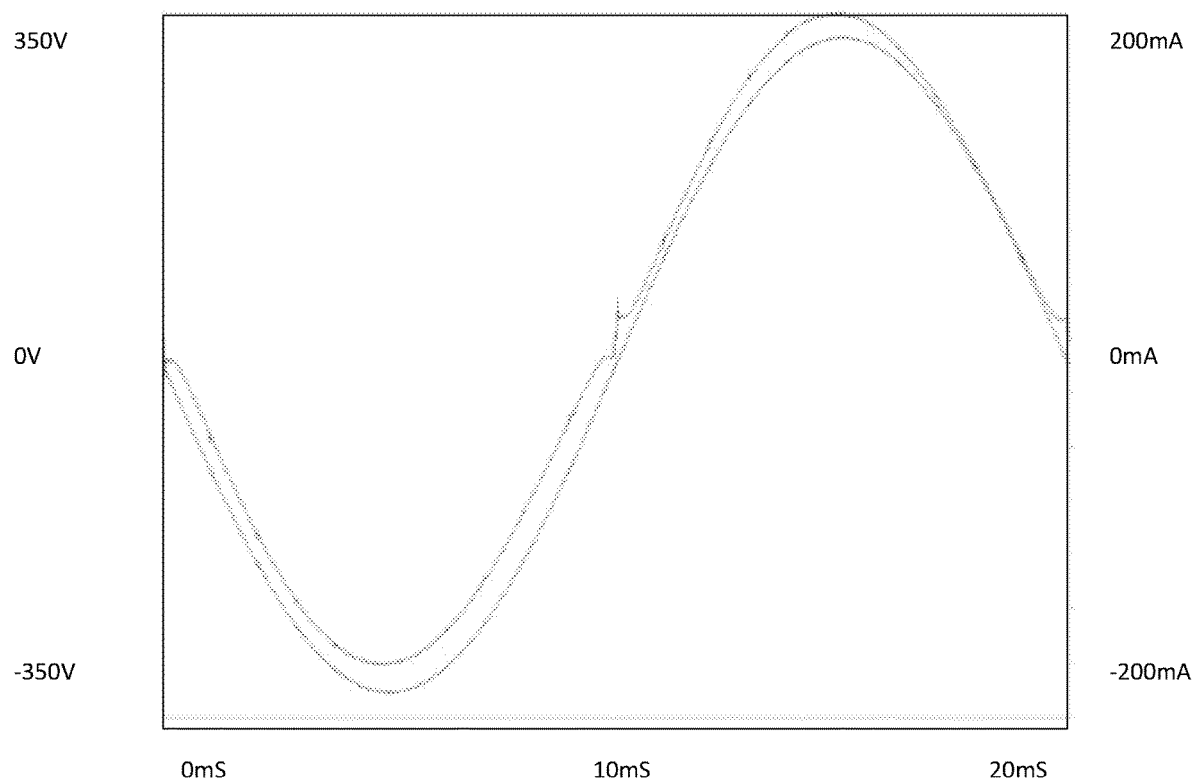
FIG. 8 shows amplitudes of current and voltage signals.

In the FIG. 8, amplitudes of current and voltage signals are shown, such as an input voltage signal (a voltage signal represented by the fluent line) present at an input of a rectifier circuit and such as an input current signal flowing through the input of the rectifier circuit (a current signal represented by the line with the small irregularities). An output of the rectifier circuit is to be coupled to the mains terminal 90 for providing the mains signal such as for example the rectified 50 Hz sine-wave voltage signal or the rectified 60 Hz sine-wave voltage signal etc. and for providing the bypass current signal during the initial time-interval E followed by the first current signal during the first time-interval A followed by the second current signal during the second time-interval B followed by the third current signal during the third time-interval C followed by the fourth current signal during the fourth time-interval D etc.

The driver 1-7 functions as follows. Each light emitting circuit 91-94 requires a minimum voltage amplitude across its contacts to start emitting light, for example 60 Volt. As long as the mains signal has a voltage amplitude below 60 Volt (the initial range during the initial time-interval E), the border control circuit 52-55 brings the bypass current switch 51 into a conducting state and a bypass current signal flows through the mains terminal 90 and the bypass current switch 51 and the current source 6 to ground. An amplitude of this bypass current signal is defined by the current source 6 as discussed further below. No light is emitted.

As soon as the mains signal has a voltage amplitude between 60 Volt and 120 Volt (the first range during the first time-interval A), the border control circuit 52-55 brings the bypass current switch 51 into a non-conducting state and the first control circuit 12-15 brings the first current switch 11 into a conducting state and a first current signal flows through the mains terminal 90 and the first light emitting circuit 91 and the first current switch 11 and the current source 6 to ground. An amplitude of this first current signal is defined by the current source 6 as discussed further below. The first light emitting circuit 91 is emitting light.

As soon as the mains signal has a voltage amplitude between 120 Volt and 180 Volt (the second range during the second time-interval B), the first control circuit 12-15 brings the first current switch 11 into a non-conducting state and the second control circuit 22-25 brings the second current switch 21 into a conducting state and a second current signal flows through the mains terminal 90 and the first and second light emitting circuits 91, 92 and the second current switch 21 and the current source 6 to ground. An amplitude of this second current signal is defined by the current source 6 as discussed further below. The first and second light emitting circuits 91, 92 are emitting light.

As soon as the mains signal has a voltage amplitude between 180 Volt and 240 Volt (the third range during the third time-interval C), the second switching circuit 2 is deactivated and the third switching circuit 3 is activated (as described above for the border, first and second switching circuits 5, 1 and 2) and a third current signal flows through the mains terminal 90 and the first, second and third light emitting circuits 91-93 and the third switching circuit 3 and the current source 6 to ground. An amplitude of this third current signal is defined by the current source 6 as discussed further below. The first, second and third light emitting circuits 91-93 are emitting light.

As long as the mains signal has a voltage amplitude between 240 Volt and 300 Volt and between 300 Volt and 240 Volt (the fourth range during the fourth time-interval D), the third switching circuit 3 is deactivated and the fourth switching circuit 4 is activated (as described above) and a fourth current signal flows through the mains terminal 90 and the first, second, third and fourth light emitting circuits 91-94 and the fourth switching circuit 4 and the current source 6 to ground. An amplitude of this fourth current signal is defined by the current source 6 as discussed further below. The first, second, third and fourth light emitting circuits 91-94 are emitting light.

As soon as the mains signal has a voltage amplitude between 240 Volt and 180 Volt (the third range during the third time-interval C), the fourth switching circuit 4 is deactivated and the third switching circuit 3 is activated and a third current signal flows through the mains terminal 90 and the first, second and third light emitting circuits 91-93 and the third switching circuit 3 and the current source 6 to ground. An amplitude of this third current signal is defined by the current source 6 as discussed further below. The first, second and third light emitting circuits 91-93 are emitting light.

As soon as the mains signal has a voltage amplitude between 180 Volt and 120 Volt (the second range during the second time-interval B), the third switching circuit 3 is deactivated and the second switching circuit 2 is activated and a second current signal flows through the mains terminal 90 and the first and second light emitting circuits 91, 92 and the second switching circuit 2 and the current source 6 to ground. An amplitude of this second current signal is defined by the current source 6 as discussed further below. The first and second light emitting circuits 91, 92 are emitting light.

As soon as the mains signal has a voltage amplitude between 120 Volt and 60 Volt (the first range during the first time-interval A), the second switching circuit 2 is deactivated and the first switching circuit 1 is activated and a first current signal flows through the mains terminal 90 and the first light emitting circuit 91 and the first switching circuit 1 and the current source 6 to ground. An amplitude of this first current signal is defined by the current source 6 as discussed further below. The first light emitting circuit 91 is emitting light.

As long as the mains signal has a voltage amplitude below 60 Volt (the initial range during the initial time-interval E), the first switching circuit 1 is deactivated and the bypass switching circuit 5 is activated and a bypass current signal flows through the mains terminal 90 and the bypass switching circuit 5 and the current source 6 to ground. An amplitude of this bypass current signal is defined by the current source 6 as discussed further below. No light is emitted, etc.

To realize these ranges, in each switching circuit each top resistor may have a value equal to 220 kΩ, each bottom resistor may have a value equal to 68 kΩ, and in the respective switching circuits 5, 1, 2, 3, 4 in this particular order the respective resistors in the middle may have a value equal to 10 kΩ, 100 kΩ, 180 kΩ, 270 kΩ and 390 kΩ. Other values and other ways to realize these ranges are not to be excluded. Similarly, other voltage values than the exemplary 60 Volt and other step values are not to be excluded.

So, the bypass switching circuit 5 guides the bypass current signal during the initial time-interval E. Amplitudes of the mains signal are in the initial range during the initial time-interval E. The first switching circuit 1 guides the first current signal through the first light emitting circuit 91 during the first time-interval A. Amplitudes of the mains signal are in the first range during the first time-interval A. The amplitudes of the mains signal in the first range are larger than the amplitudes of the mains signal in the initial range. The second switching circuit 2 guides the second current signal through a combination of the first light emitting circuit 91 and the second light emitting circuit 92 during the second time-interval B. Amplitudes of the mains signal are in the second range during the second time-interval B. The amplitudes of the mains signal in the second range are larger than the amplitudes of the mains signal in the first range etc.

In a prior art situation, the amplitudes of the current signals had fixed, constant values. According to the invention, the driver 1-7 is provided with an adaptation circuit 6, 7 for adapting an amplitude of the bypass current signal during the initial time-interval E and for adapting an amplitude of the first current signal during the first time-interval A and for adapting an amplitude of the second current signal during the second time-interval B etc. As a result, a total harmonic distortion of the driver 1-7 can be further reduced.

Preferably, for example, said adapting may comprise an adaptation in response to information derived from the (instantaneous) amplitude of the mains signal. And/or, said adapting may comprise an adaptation, said adaption comprising an increase of the amplitudes of the respective current signals when the amplitude of the mains signal in the respective ranges is increasing, and said adaption comprising a decrease of the amplitudes of the respective current signals when the amplitude of the mains signal in the respective ranges is decreasing.

Preferably, for example, said adapting may comprise shaping the amplitudes of the current signals in response to information derived from the (instantaneous) amplitude of the mains signal. And/or, said adapting may comprise shaping the amplitudes of the respective current signals, the shaped amplitudes of the respective current signals being substantially identical to shapes of the amplitude of the mains signal in the respective ranges. This will lead to a lowest total harmonic distortion, and is for example realized through the embodiments of the adaptation circuit 6, 7 shown in the FIGS. 5 and 6:

The adaptation circuit 6, 7 comprises the current source 6 for in response to the definition signal defining the amplitudes of the current signals and comprises the definition circuit 7 for in response to the detection of the (instantaneous) amplitude of the mains signal providing the definition signal to the current source 6. This detection is performed via the input voltage divider 71, 72. The inverting transistor 72 (in combination with the resistors 74-77) inverts this detection. The inverted detection is supplied to the control input of the programmable regulator 80 (via the resistors 75-77). Owing to the fact that this programmable regulator 80 has a negative transfer, an output voltage at the output of this programmable regulator 80 will follow the amplitude of the mains signal. Owing to the fact that the output of the programmable regulator 80 is coupled to the first main electrode (emitter) of the output transistor 83, and owing to the fact that from the control electrode (basis) to the first main electrode (emitter) of the output transistor 83 a fixed voltage is present, a voltage at the control electrode (basis) of the output transistor 83 will follow the amplitude of the mains signal. Owing to the fact that the current source 6 comprises a resistor 61, an amplitude of a current signal defined by the current source 6 will follow the amplitude of the mains signal. As a result, as shown in the FIG. 8, the amplitude of the input voltage signal represented by the fluent line and the amplitude of the input current signal represented by the line with the small irregularities have become relatively identical in shape, and a lowest total harmonic distortion is realized.

The driver does not require the adjusting and tuning of electromagnetic interference filters. The driver has a high power factor >0.99 and does not require magnetic components. The driver behaves as a feed-forward circuit and does not behave as a feed-back circuit that may show delay and instability. The driver mimics an almost pure resistive load and does not introduce any phase-shift.

In a minimum situation, there will be two light emitting circuits, one bypass switching circuit, first and second switching circuits and an adaptation circuit. In a more extended situation, more light emitting circuits and more switching circuits may be present.

The current source, the definition circuit, and the switching circuits are shown in an exemplary way, many other embodiments will be possible and are not to be excluded. The current source may for example be a digitally controlled current source and the definition circuit may then be a processor, with the definition signal being a digital signal etc.

First and second elements can be coupled indirectly via a third element and can be coupled directly without the third element being in between.

Summarizing, drivers 1-7 comprise respective switching circuits 1, 2 for guiding respective current signals during respective time-intervals for the sequential driving of light emitting circuits 91-94. The respective time-intervals are defined by the fact that amplitudes of a mains signal are in respective ranges during the respective time-intervals. An adaptation circuit 6, 7 adapts amplitudes of the respective current signals during the respective time-intervals, to reduce a total harmonic distortion. Said adapting may comprise an adaptation in response to information derived from the amplitude of the mains signal, and may comprise shaping the amplitudes of the current signals in response to information derived from the amplitude of the mains signal. Preferably, the shaped amplitudes of the respective current signals will be substantially identical to shapes of the amplitude of the mains signal in the respective ranges. The adaptation circuit 6, 7 may comprise a current source 6 and a definition circuit 7.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A driver adapted to connect to light emitting circuits and for driving the light emitting circuits, the driver comprising:
   a bypass switching circuit for guiding a bypass current signal which bypasses all light emitting circuit during an initial time-interval, amplitudes of a mains signal for feeding the driver being in an initial range and less than a minimum voltage amplitude across a first light emitting circuit to start emitting light during the initial time-interval,
   a first switching circuit for guiding a first current signal through the first light emitting circuit during a first time-interval, amplitudes of the mains signal being in a first range during the first time-interval, the amplitudes of the mains signal in the first range being larger than the amplitudes of the mains signal in the initial range,
   a second switching circuit for guiding a second current signal through a series connection of the first light emitting circuit and a second light emitting circuit during a second time-interval, amplitudes of the mains signal being in a second range during the second time-interval, the amplitudes of the mains signal in the second range being larger than the amplitudes of the mains signal in the first range, and an adaptation circuit for adapting an amplitude of the bypass current signal during the initial time-interval and for adapting an amplitude of the first current signal during the first time-interval and for adapting an amplitude of the second current signal during the second time-interval so that the bypass current follows the mains signal at least in the form.

2. The driver as defined in claim 1, wherein the driver further comprising an input for receiving input power, the bypass switching circuit is connected across the input and is adapted to short circuit the input, via a series connection with the adaptation circuit, and to guide the bypass current directly across the input without going through the first light emitting circuit or the second light emitting circuit.

3. The driver as defined in claim 1, said adaptation circuit is for adapting the amplitudes in response to information derived from the amplitude of the mains signal, wherein in case the amplitude of the mains signal is changing, the adaptation circuit is adapted to adapt the amplitude of the corresponding current signal..

4. The driver as defined in claim 1, said adaptation circuit is for:

increasing the amplitudes of the respective current signals when the amplitude of the mains signal in the respective ranges is increasing, and decreasing of the amplitudes of the respective current signals when the amplitude of the mains signal in the respective ranges is decreasing.

5. The driver as defined in claim 1, said adaptation circuit is for shaping the amplitudes of the current signals in response to information derived from the amplitude of the mains signal, wherein in case the amplitude of the mains signal is changing to a relatively small extent, the adaptation circuit is adapted to shape the amplitude of the corresponding current signal to a relatively small extent, and in case the amplitude of the mains signal is changing, the adaptation circuit is adapted to shape the amplitude of the corresponding current signal.

6. The driver as defined in claim 1, said adaptation circuit is for shaping the amplitudes of the respective current signals, the shaped amplitudes of the respective current signals being identical to shapes of the amplitude of the mains signal in the respective ranges.

7. The driver as defined in claim 1, the adaptation circuit comprising a current source for in response to a definition signal defining the amplitudes of the bypass current signal, the first current signal and the second current signal, and the adaptation circuit further comprising a definition circuit for in response to a detection of the amplitude of the mains signal providing the definition signal to the current source.

8. A device comprising the driver as defined in claim 1 and further comprising the first and second light emitting circuits.

9. The driver as defined in claim 1, wherein the adaptation circuit is adapted such that at least one of the first current and the second current follows the mains signal at least in the form, and wherein the mains signal is mains voltage.

* * * * *